United States Patent [19]

Danz

[11] Patent Number: 5,787,662
[45] Date of Patent: Aug. 4, 1998

[54] CONSTRUCTIONAL ELEMENT FOR GLAZING BUILDING STRUCTURES

[76] Inventor: Robert Danz, Cheruskerstrasse 13, D 71101 Schonaich, Germany

[21] Appl. No.: 356,254
[22] PCT Filed: Jun. 14, 1993
[86] PCT No.: PCT/EP93/01491
    § 371 Date: Mar. 22, 1995
    § 102(e) Date: Mar. 22, 1995
[87] PCT Pub. No.: WO94/02696
    PCT Pub. Date: Feb. 3, 1994

[30] Foreign Application Priority Data

Jul. 21, 1992 [DE] Germany .................. 42 23 694.0

[51] Int. Cl.$^6$ ............... E04D 3/06; E06B 3/54; E04B 7/02; E04B 1/38
[52] U.S. Cl. ............. 52/235; 52/200; 52/506.05
[58] Field of Search ................ 52/235, 200, 73, 52/74, 291, 506.05, 745.06

[56] References Cited

U.S. PATENT DOCUMENTS 4,689,928  9/1987  Dutton et al. .
5,027,567  7/1991  Roberts .

FOREIGN PATENT DOCUMENTS 0277535  8/1988  European Pat. Off. .
3927653  3/1991  Germany .

OTHER PUBLICATIONS

"cite des sciences et de l'industrie–naissance d'un monument", Alain Pelissier, Techniques & Architecture, vol. 364, 1986, Paris, p. 89.

Primary Examiner—Robert Canfield
Attorney, Agent, or Firm—Sughrue, Mion, Zinn, Macpeak & Seas, PLLC

[57] ABSTRACT

A constructional element for glazing with glass sheets (1) includes laminated safey glass using glass retaining elements (5, 6; 10) for at least one support plate (12) for glass panes provided with holes with tolerance compensation as well as fixing elements which act together with these. This constructional element is characterized by at least one glass sheet (1) and struts (2) which are spanned under this glass sheet and are connected with the glass sheet by means of glass retaining elements (5, 6; 10) such that they act against the plane of the glass sheet at an acute angle, as well as by a support strut (4) located at the connection point of the two struts, whereby said support strut is also connected with the glass sheet by means of a glass retaining element (6), and whereby fixing of the struts (2, 4) with the glass sheet is realized by the glass retaining elements in the form of a positive and non-positive connection in such a way that the under-spanning struts (2), support strut (4) and glass sheet (1) arc able to withstand tension and pressure loading.

9 Claims, 8 Drawing Sheets

CONSTRUCTIONAL ELEMENT FOR GLAZING BUILDING STRUCTURES

BACKGROUND OF THE INVENTION

The invention relates to a constructional element for large-area glazing of building structures, for example for waiting rooms, canopies, galleries, station concourses, exhibition halls and similar.

It has been shown that it is not possible to obtain fully satisfactory solutions with the already known fixing means.

The invention is based on the idea of applying the system with under-spanned girder known from general statics to large-area glass sheets made of laminated safety glass. At the same time, this principle should be capable of use for any arbitrary alignment of a large number of such glass sheets. However, this was not possible with the previously known fixing means.

The reason for this difficulty is that laminated safety glass sheets have to be provided with holes for the fixing means before they are produced by bonding two or more panes together, whereby experience shows that these holes are often not precisely aligned with each other after the panes have been bonded together. Also, tolerances cannot be avoided when the panes are drilled.

Furthermore, it is desirable to make the holes for the two panes or for the more than two panes of a laminated safety glass sheet slightly larger for the purpose of tolerance compensation.

If the known glass retaining elements were to be used to secure glass sheets of this kind, this could be realized only for small glass sheets and only in horizontal position. Large-area glass sheets made of laminated safety glass with an area of up to 15 m² cannot be installed in such a way, and particularly not in inclined position, simply because of their size and weight.

SUMMARY OF THE INVENTION

It is the object of the invention to demonstrate a solution which permits large-area glazing of building structures with glass sheets made of laminated safety glass.

This is achieved by the invention through the characteristics of patent claim 1 in its entirety.

Other characteristics of the invention are described in the other claims. It must be noted that a constriction capable of withstanding tension and pressure loads in all parts, including the glass sheets, is obtained by using glass retaining elements which are anchored in holes in the glass sheets in a positive and non-positive way and which have rod anchoring devices attached to them, whereby the corresponding rods serve as under-spanning struts or support struts.

Even the under-spanning struts acting at an acute angle to the glass sheet are positively and non-positively connected with the glass sheet by way of the glass retaining elements in the new embodiment so that all forces resulting from pressure on the glass sheet or suction forces acting on the glass sheet can be absorbed, i.e. the support strut too is subjected to both tension and pressure loads.

The invention will now be described in greater detail on the basis of example embodiments in conjunction with the enclosed drawings.

DETAILED DESCRIPTION OF THE INVENTION

Figure 1:
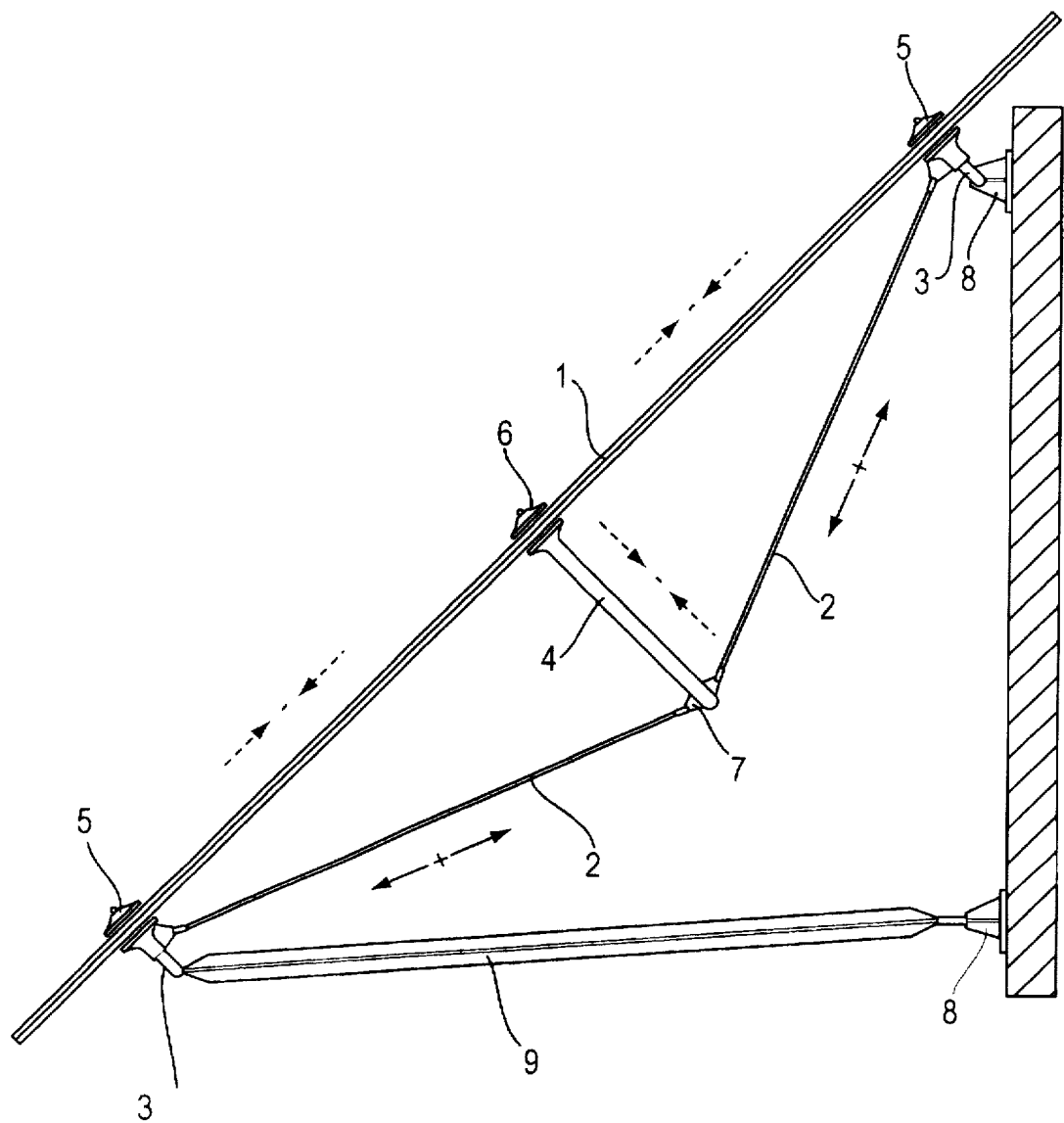
FIG. 1 schematically shows the constructional element in accordance with the invention.

The problem related to large-area and therefore heavy glass sheets made of laminated safety glass which sag as a result of their own weight will be explained first with reference to FIG. 1.

A large-area glass sheet 1 made of laminated safety glass is supported via a support strut 4 by two struts 2 spanned under the glass sheet. The under-spanning struts 2 are connected with the glass sheet 1 by glass retaining elements 5, whose actual embodiment will be explained in more detail later on.

An important feature is that the glass sheets cannot be secured at the corners or in the edge zones due to the unavoidable secondary bending forces which occur there. In fact, fixing should take place if possible at locations with minimum deformation of the glass sheet, as is schematically indicated in FIG. 1, i.e. at locations which result in homogeneous loading of the glass sheets.

The support strut 4 is connected with the under-spanning struts 2 by means of a double-eye link plate 7. The whole construction of the sloping glass sheet 1 is fixed on wall brackets 8 and supported against the wall by a further strut 9. The connection is made by means of supports 3 which are connected with the glass retaining elements 5. This will be explained below.

It is immediately possible to see that tension and pressure forces occur, as indicated by arrows, in the struts 2 and 4 as well as 9 and, quite importantly, in the glass sheet itself, whereby these forces are caused on the one hand by the weight of the glass sheet of up to 900 kg, as well as by wind load, snow load, rain or also by suction, which may be so strong that the pressure acting on the support strut 4 is overcompensated and a tension force is produced as a result.

However, these forces must be absorbed at all fixing points of the glass sheet 1 both positively and non-positively. This would not be possible under the conditions described above with larger and possibly offset holes in the panes forming the glass sheet, since the bolts of the glass retaining elements are harder than the glass of the panes, with the result that there would be a risk of the panes breaking in the event of direct contact between the panes and the bolt. In addition, tolerance compensation must also be possible after installation. FIGS. 1a to 1c show schematically how this problem is solved.

Figure 1A:
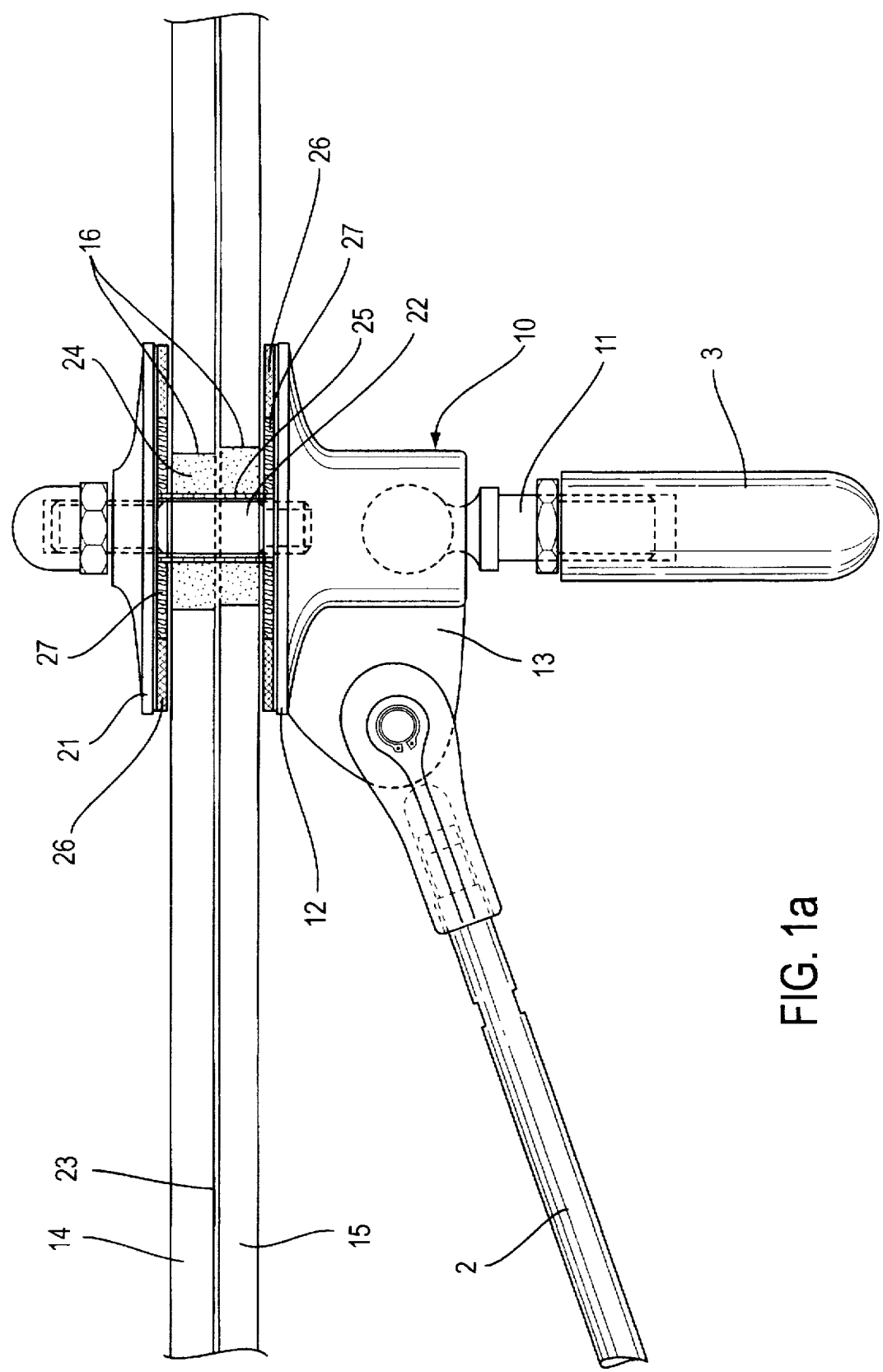
FIG. 1a, 1b and 1c show individual parts of this construction.
Figure 1B:
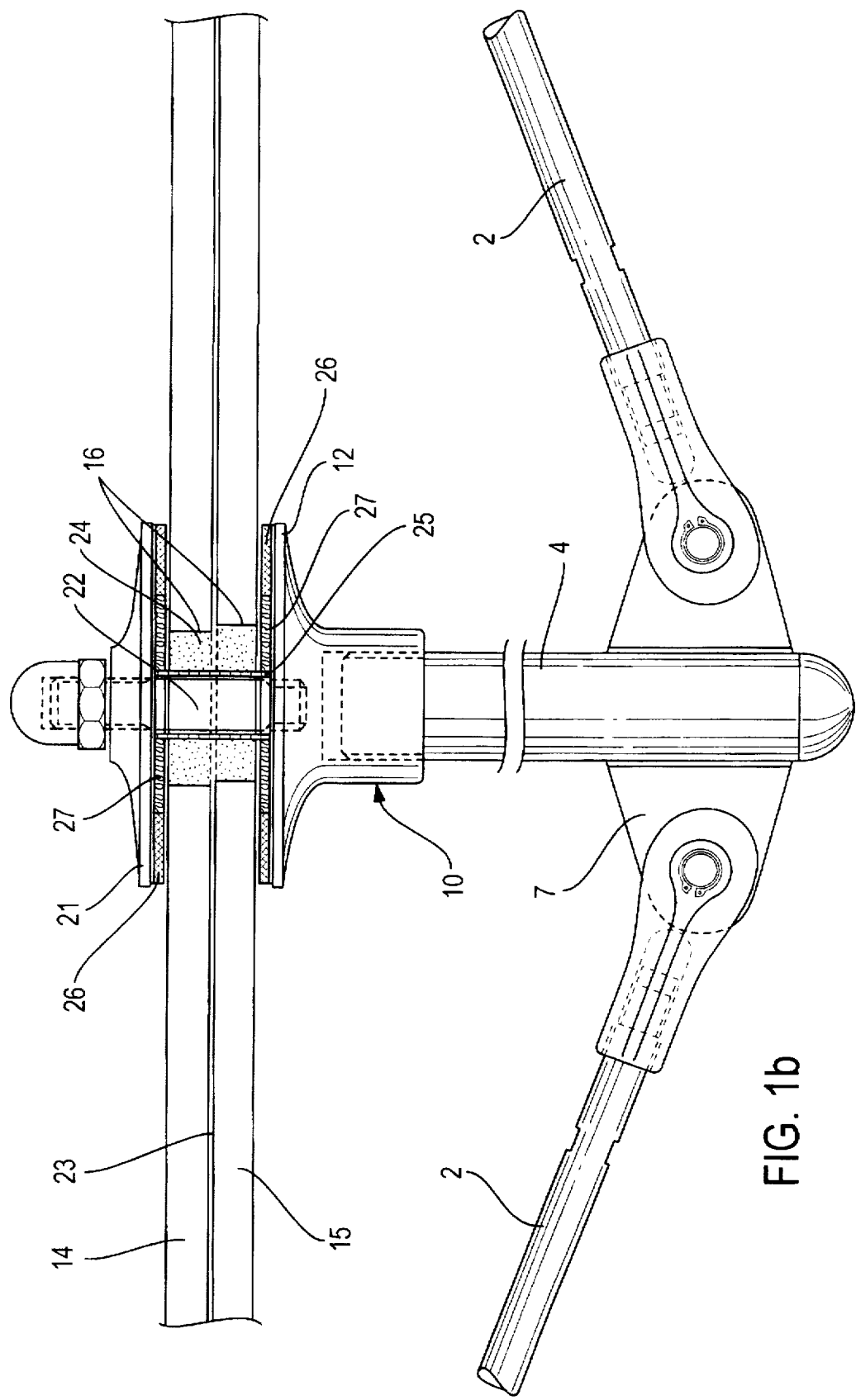
Figure 1C:
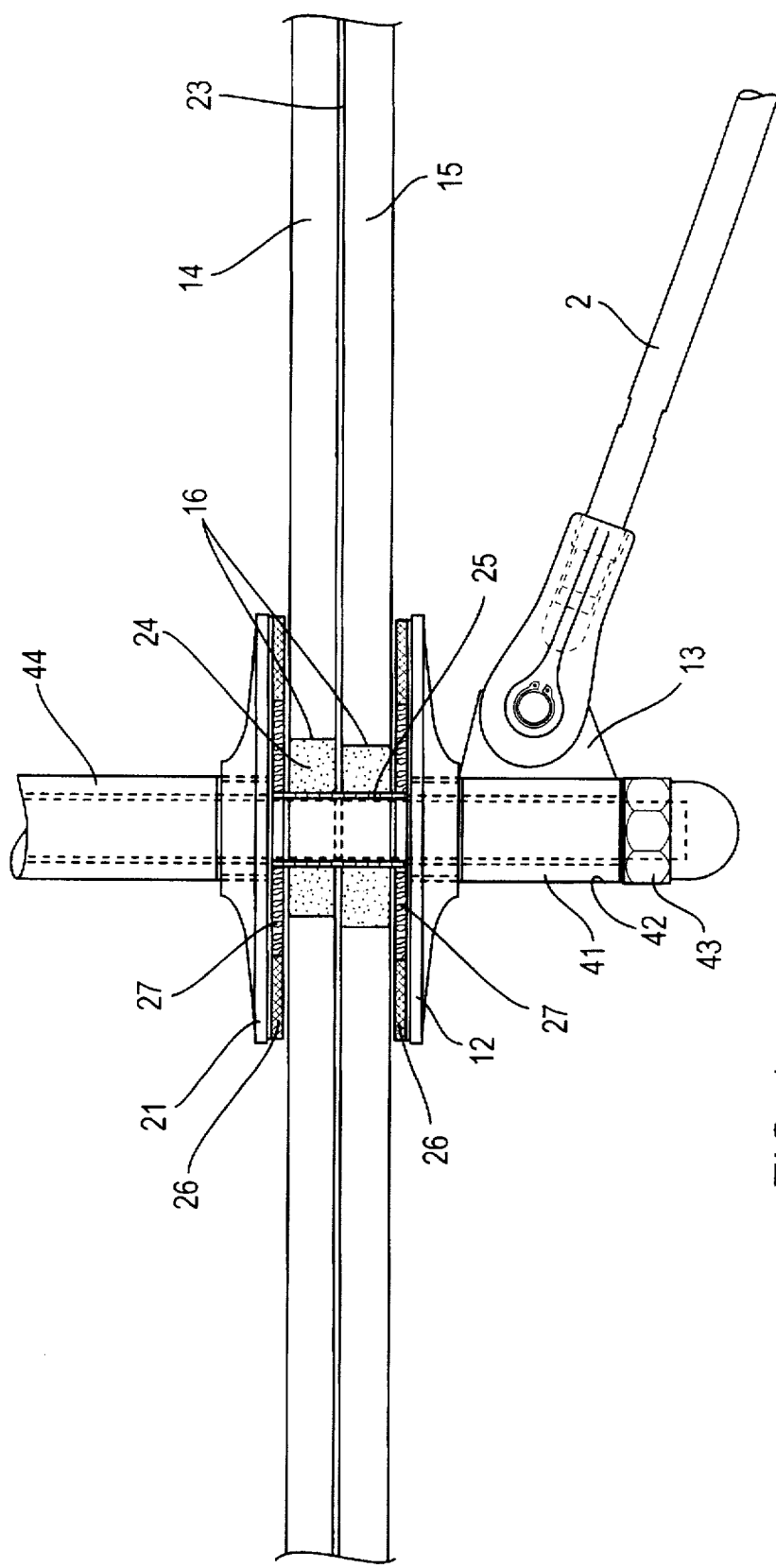

FIG. 1a shows fixing of the glass retaining element 10 in the position in FIG. 1 labelled 5 at the top right. It is possible to see a glass retaining element, as is described in principle for support of wall or floor slabs without bending moments in DE-A 39 27 653.8.

An externally threaded load-bearing bolt 11 of the glass retaining element 10 is screwed into the internally threaded support 3. This provides the first possibility for tolerance compensation with respect to the upper wall bracket 8.

The glass retaining element 10 possesses a first bottom support plate 12 as well as a side-located eye 13 for a rod anchoring device with a tension rod serving as an under-spanning strut 2 fixed to this. Two glass panes 14, 15 which form the glass sheet made of laminated safety glass normally rest on the support plate 12. However, it is recommended to insert an outer neoprene ring 26 with a Shore hardness of approx 80 and an inner silicone rubber ring 27 with a Shore hardness of approx. 40 in between. It is also possible to clearly see the edges 16 of the slightly offset holes in the glass panes 14 and 15, which are bonded together by an adhesive layer 23.

The holes are considerably larger than would be necessary for actual fixing. This is of benefit for later tolerance compensation.

Fixing takes place by a second support plate 21, which can be screwed into the support plate 12 by means of a threaded bolt 22 and which can be pressed on by means of a cap nut placed on this. The screw bolt and cap nut may also consist of one piece. Here too, it is recommended to use an intermediate layer consisting of an outer neoprene ring 26 with a Shore hardness 80 and an inner silicone rubber ring with a Shore hardness 40.

For the purpose of installation, the friction which is achieved by the pressing together of the support plates 12 and 21 by means of the neoprene rings is initially sufficient to fix the glass sheet and nevertheless still permit subsequent adjustment.

The threaded bolt 22 is additionally surrounded by a sleeve 25.

When the glass sheet has been installed to this point, tie hollow space between the edges of the two panes 14 and 15 which form the glass sheet and the sleeve 25 surrounding the threaded bolt 22 are filled with a two-component plastic paste which then hardens within around 24 hours to a Shore hardness of around 80 whilst still keeping a certain, if limited, flowability. In other words, final fine tolerance compensation can be performed after filling in this plastic, after which the fixing bolts can then be securely tightened.

When the plastic 24 has fully hardened, there is a positive and non-positive connection between the glass panes 14, 15 of the glass sheet 1 and the glass retaining element. In other words, this connection between the glass sheet 1 made of laminated safety glass and the glass retaining element is able to absorb all tension and pressure forces as indicated in FIG. 1.

The harder neoprene ring 26 is responsible for the contact pressure and load pressure forces resulting from bending of the glass sheet, whilst the softer silicone rubber ring is provided for the purpose of material separation between the metal/support plates 12, 21 and the two-component epoxy resin 24. The sleeve 25 also serves to separate the metal of the threaded bolt 22 from the hardened two-component epoxy resin 24.

In addition, the occurrence of secondary bending and restraining forces at the support plates is avoided. Finally, it must be pointed out that the ball joint shown in the glass retaining element 10 ensures that the glass sheet is supported without bending moments.

This construction also offers the considerable advantage that the glass retaining element 10 can be easily removed and reused in the event of damage.

FIG. 1b shows fixing of the glass sheet instead of the glass retaining element 6 in FIG. 1. Identical parts are again provided with the same reference number and require no further explanation.

A double-eye link plate 7 for rod anchoring devices is secured, preferably cast-on or welded-on, on the support strut 4. This serves to support two rod anchoring devices to hold tension rods forming the under-spanning Struts 2.

FIG. 1c shows fixing of the glass retaining assembly at the location of the lower glass retaining element 5 in FIG. 1. An eye link plate 13 is provided here in conjunction with the glass retaining element for a rod anchoring device to hold a tension rod which forms the second under-spanning strut 2. The eye link plate 13 is formed on a sleeve 42 which is held on a threaded bolt 41 by a cap nut 43. The bolt 41 extending through the holes in the panes 14 and 15 as well as the plate 21. An extension rod 44 is secured to the bolt 41.

Figure 2:
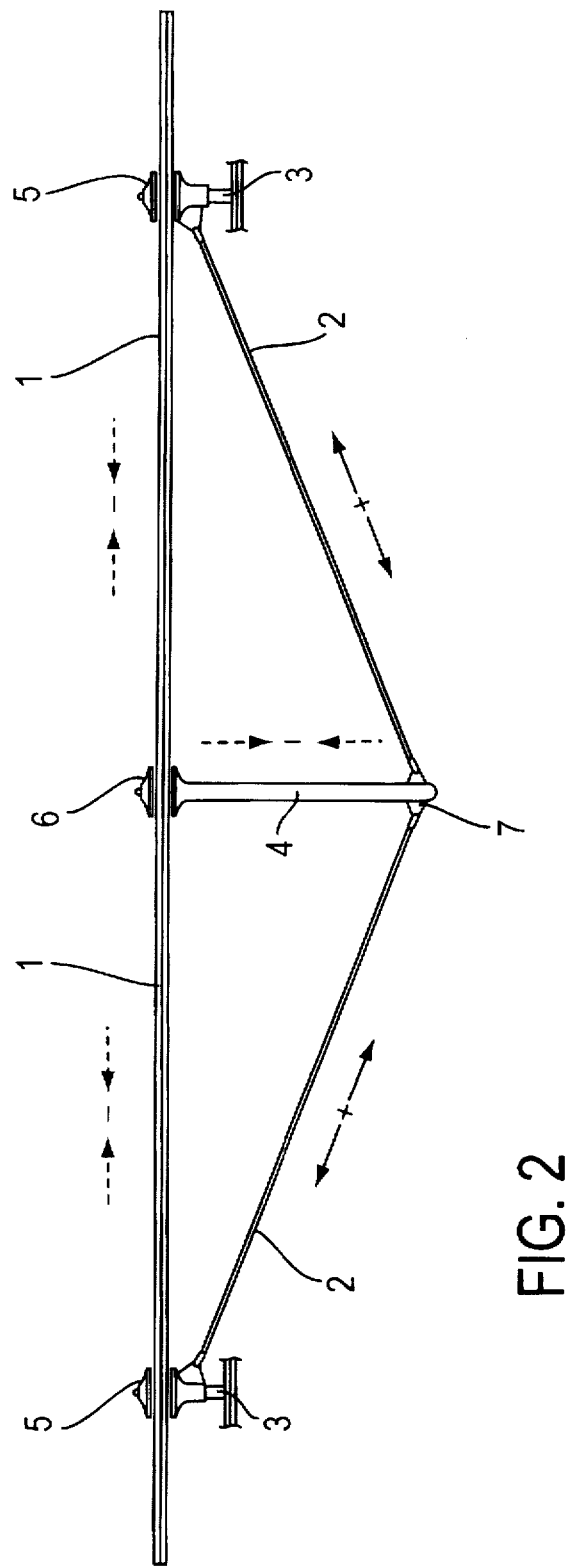
FIG. 2 shows a further example embodiment of the invention.

FIG. 2 schematically shows fixing of a glass sheet made of laminated safety glass with an area of around 15 m$^2$ and a weight of approx. 900 kg. Such a large and heavy glass sheet can be secured safely in this way. This construction is able to absorb all tension and pressure forces draws here. Identical parts are again provided with the same reference numbers as in FIG. 1.

Figure 3:
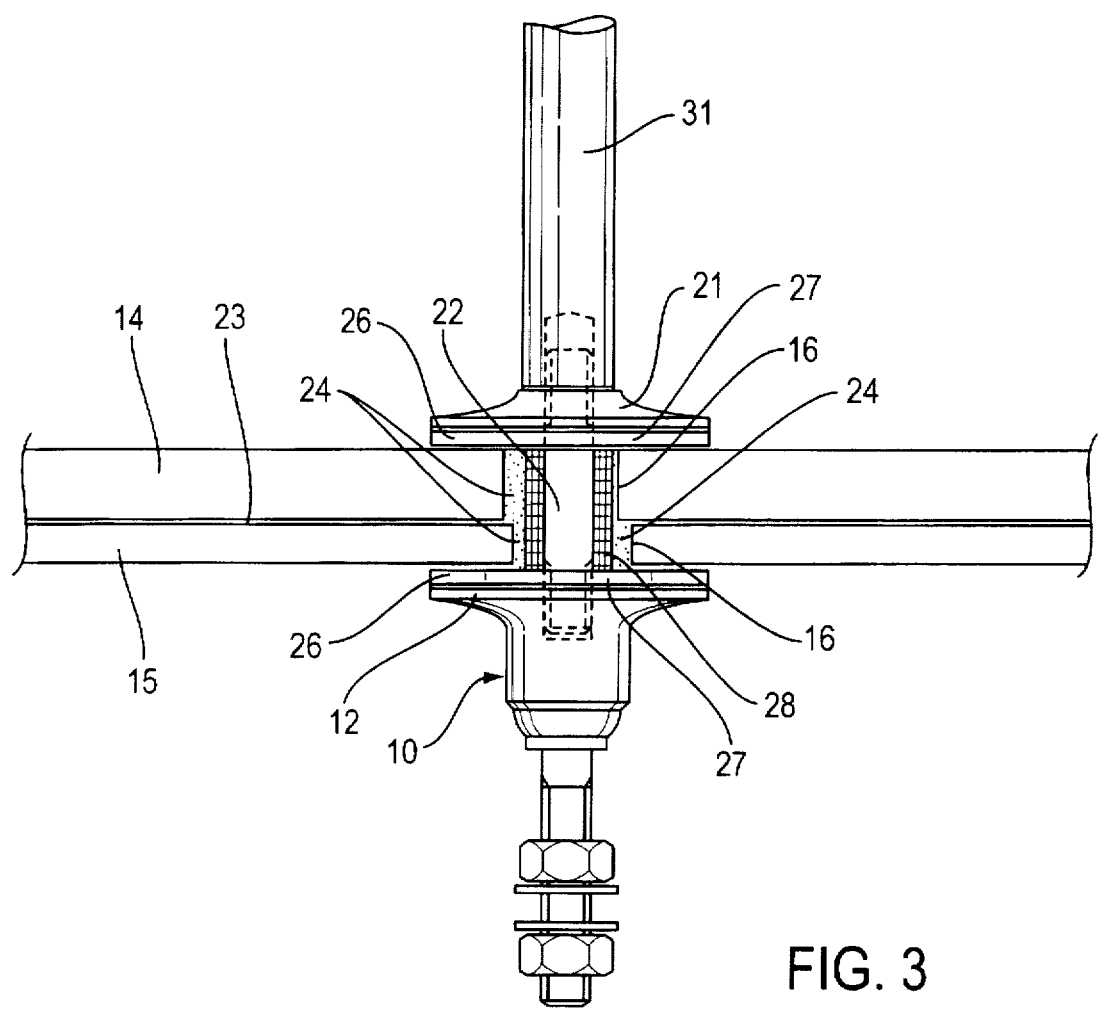
FIG. 3 shows a first embodiment form for fixing a glass retaining element on a glass sheet.

FIG. 3 shows a further fixing method which does not require more detailed explanation. Identical parts have the same reference numbers as in FIGS. 1a and 1c. However, the cap nut above the support plate 21 is replaced by a tension rod 31 or pressure rod provided with an internal thread and screwed onto the bolt 22.

Figure 4:
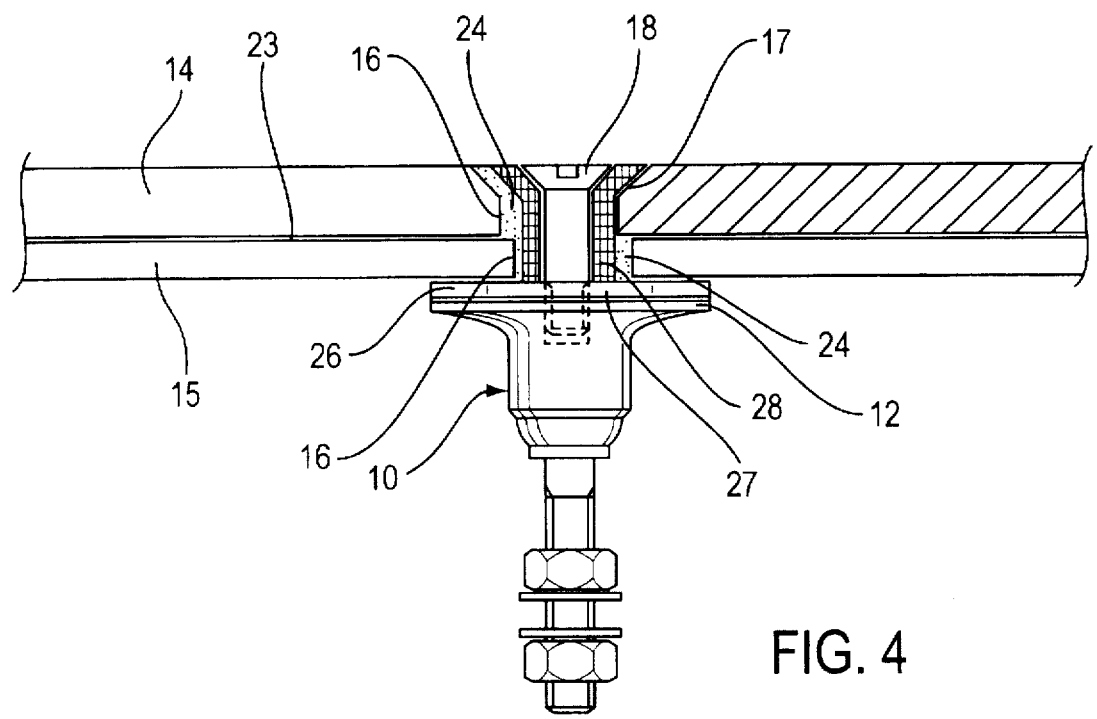
FIG. 4 shows a further embodiment form for fixing the glass retaining element on the glass sheet.

FIG. 4 shows another embodiment. Identical parts are provided with the same reference number as in FIG. 3. A truncated-cone extension 17 is provided in the top glass pane 14 of the glass sheet, whereby a correspondingly shaped plastic sleeve 28 is inserted in said extension. A countersunk-head screw 18 is screwed into the internal thread of the support plate 12 through this plastic sleeve. The space between the edges of the glass panes 14 and 15 which form the glass sheet is again filled with two-component plastic 24. Otherwise, the construction is the same as before. This results in a smooth termination to the outside.

Figure 5:
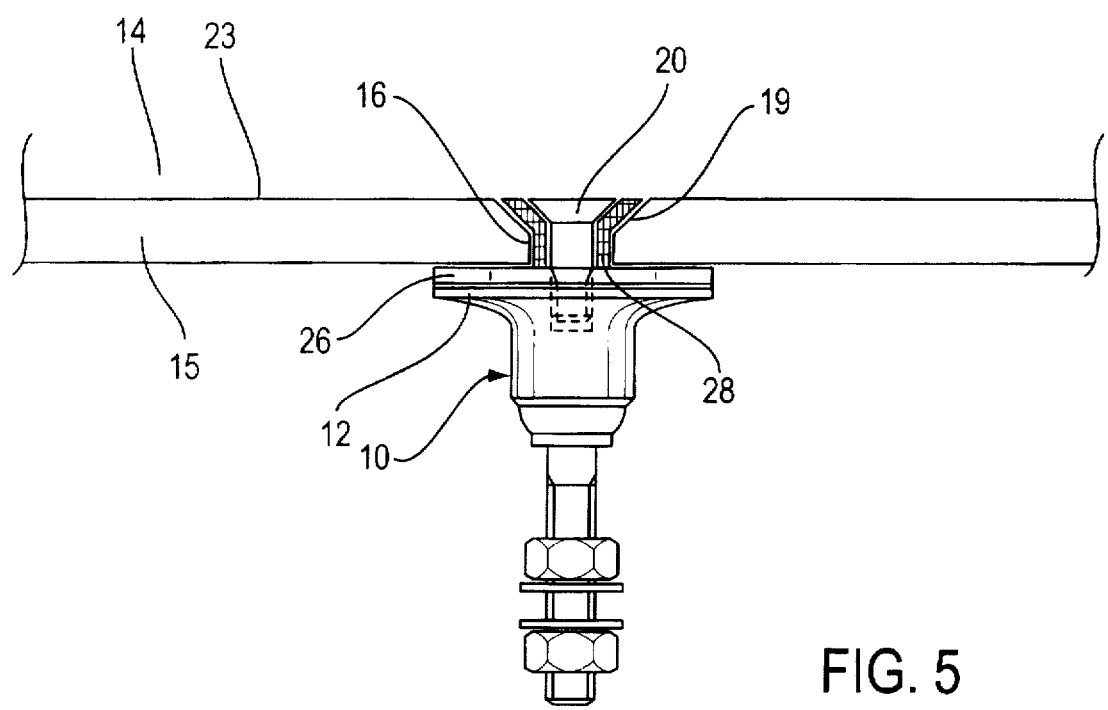
FIG. 5 shows a different method of fixing a glass retaining element for a suspended glass sheet.

FIG. 5 shows a final embodiment. Here too, the same, most important parts are provided with the same reference number as before. In this special case, the glass sheet is produced only after fixing by bonding the two glass panes 14 and 15 by way of the adhesive layer 23.

A truncated-cone extension 19 is provided in the bottom glass pane 15, whereby a correspondingly shaped plastic sleeve 28 is inserted in said extension and whereby a short countersunk-head screw 20 can be screwed into the support plate 12 through said sleeve. Any spaces between the plastic sleeve 28 and edges 16 of the glass pane 15 can also be filled, although not shown here, with two-component plastic 24.

This new construction permits safe installation of large-area, heavy glass sheets for canopies, hall roofs and similar, something which was not possible with the previously known constructions. It must be expressly pointed out that the invention is not restricted to glass sheets consisting of two glass panes which are bonded together. The invention can also be applied analogously to triple laminated safety glass. An important point to be observed above all is that fixing does not take place in the area of the edges or corners of the glass sheet but in areas with minimum deformation of the glass sheet, i.e. at the locations which produce homogeneous loading of the glass sheet.

What is claimed is:

1. A constructional element for glazing a building structure comprising: a glass sheet made of laminated safety glass and having a plurality of holes extending therethrough, at least two under-spanning struts secured to an underside of said glass sheet by a glass retaining element at a first end of each of said under-spanning struts and a support strut connected at one end to said glass sheet by a further glass retaining element and at an opposite end to a second end of each under-spanning strut, wherein said second ends of said under-spanning struts are spaced further from said glass sheet than said first ends of said under-spanning struts with said under-spanning struts acting against said glass sheet at an acute angle and wherein said glass retaining elements form a positive and non-positive connection such that the under-spanning struts, the support strut and the glass sheet are capable of being subjected to tension and pressure forces.

2. A constructional element as set forth in claim 1, wherein the non-positive and positive connection between the glass sheet and glass retaining elements is comprised of a filling of plastic material having a limited flow ability disposed between an edge of each hole in the glass sheet and a threaded bolt of the glass retaining element which extends through each hole whereby the final hardness of said plastic material after the end of polymerization is lower than the hardness of the glass sheet.

3. A constructional element as set forth in claim 2, wherein each said bolt is secured to first and second support plates disposed on opposite surfaces of said glass sheet.

4. A constructional element as set forth in claim 3, wherein a neoprene ring having a Shore hardness of around 80 is located between each support plate and the glass sheet.

5. A constructional element as set forth in claim 4, wherein a silicon rubber ring with a Shore hardness of approximately 40 is disposed between each support plate and the glass sheet.

6. A constructional element as set forth in claim 2, further comprising a plastic sleeve surrounding each bolt extending through a hole for separating said plastic filler material from said bolt.

7. A constructional element as set forth in claim 1, wherein said glass sheet is comprised of a top pane and a bottom pane and each hole extending through the glass sheet is provided with a truncated-cone extension in the upper pane of the glass sheet and further comprising a truncated-cone shaped plastic sleeve disposed in said extension and a countersunk-head screw extending through the sleeve and the hole into engagement with the support plate adjacent the bottom pane.

8. A constructional element as set forth in claim 1, wherein the glass sheet is comprised of a top pane and a bottom pane and each hole in the glass sheet extends only through the bottom pane and is provided with a truncated-cone extension and further comprising a truncated-cone shaped plastic sleeve disposed in said extension and a countersunk-head screw extending through the plastic sleeve and the bottom pane with the screw secured to the support plate adjacent the bottom pane, said top pane being bonded to said bottom pane in overlying relation with respect to the screw.

9. A constructional element as set forth in claim 1, wherein the glass retaining elements for connecting the under-spanning struts to the glass sheets are located in areas of minimum deformation with homogeneous loading of the glass sheet.

* * * * *